US012617451B2

(12) United States Patent
Li

(10) Patent No.: US 12,617,451 B2
(45) Date of Patent: May 5, 2026

(54) OIL-IMMERSED STEERING GEAR

(71) Applicant: Jiangxi Jizhun Technology Co., Ltd., Ganzhou (CN)

(72) Inventor: Wei Li, Ganzhou (CN)

(73) Assignee: Jiangxi Jizhun Technology Co., Ltd., Ganzhou (CN)

( * ) Notice: Subject to any disclaimer, the term of this patent is extended or adjusted under 35 U.S.C. 154(b) by 509 days.

(21) Appl. No.: 18/318,785

(22) Filed: May 17, 2023

(65) Prior Publication Data

US 2023/0286568 A1 Sep. 14, 2023

(30) Foreign Application Priority Data

Mar. 7, 2023 (CN) .......................... 202310209861.X

(51) Int. Cl.
B62D 5/04 (2006.01)
F16H 57/04 (2010.01)

(52) U.S. Cl.
CPC ....... B62D 5/0406 (2013.01); F16H 57/0408 (2013.01); F16H 57/0457 (2013.01)

(58) Field of Classification Search
CPC .............. B62D 5/0406; F16H 57/0408; F16H 57/0457
USPC ........................................................ 180/444
See application file for complete search history.

(56) References Cited

U.S. PATENT DOCUMENTS

| | | | | |
|---|---|---|---|---|
| 5,732,790 A | * | 3/1998 | Endo .................... | B62D 5/0406 180/444 |
| 2010/0307857 A1 | * | 12/2010 | Shinagawa .............. | B62D 5/06 180/421 |
| 2022/0057805 A1 | * | 2/2022 | Ogihara .................. | F04B 17/05 |

FOREIGN PATENT DOCUMENTS

| | | | | | |
|---|---|---|---|---|---|
| CN | 205446660 U | * | 8/2016 | | |
| CN | 107116556 A | | 9/2017 | | |
| CN | 110587590 A | | 12/2019 | | |
| CN | 112083706 A | | 12/2020 | | |
| CN | 212226142 U | * | 12/2020 | | |
| CN | 114559425 A | * | 5/2022 | .............. | B25J 9/102 |
| CN | 116409379 A | * | 7/2023 | .............. | B62D 5/04 |

* cited by examiner

*Primary Examiner* — Valentin Neacsu
*Assistant Examiner* — Mohamed M Medani
(74) *Attorney, Agent, or Firm* — JEEN IP LAW, LLC

(57) ABSTRACT
The present invention belongs to the technical field of steering gears, and specifically discloses an oil-immersed steering gear, including a shell assembly, where a control chamber and an oil immersion chamber are separated in the shell assembly. According to the oil-immersed steering gear of the present invention, the gear transmission assembly is immersed in the liquid gear oil in the oil immersion chamber, so that fluid lubrication conditions can be maintained in a meshing area of the gear transmission assembly for a long time, thereby preventing gear wear, ensuring stable output speed, and prolonging the service life of the steering gear. Even if the steering gear is used for a long time, no noise will be made.

9 Claims, 4 Drawing Sheets

OIL-IMMERSED STEERING GEAR

CROSS-REFERENCE TO RELATED APPLICATIONS

The application claims priority to Chinese patent application No. 202310209861.X, filed on Mar. 7, 2023, the entire contents of which are incorporated herein by reference.

TECHNICAL FIELD

The present invention belongs to the technical field of steering gears, and in particular relates to an oil-immersed steering gear.

BACKGROUND

A steering gear is a position (angle) servo driver, which is suitable for control systems that require changing angles that can be maintained, and has at present been widely used in various fields such as high-end remote control toys, for example, aircraft and submarine models, remote robots, etc.

Generally, the steering gear is mainly composed of a reduction gear set, a position feedback potentiometer, a control circuit board and a direct current motor. An output shaft of the steering gear is connected to the position feedback potentiometer. The control circuit board receives a control signal from a signal line. An IC on the control circuit board drives the motor to rotate, and the motor drives a series of gear sets to decelerate and then be transmitted to an output steering wheel. When rotating, the steering wheel drives the position feedback potentiometer to output a voltage signal to the control circuit board for feedback, and then the control circuit board determines the rotating direction and speed of the motor according to the position, thereby achieving the stop of a target.

In the existing steering gear, the reduction gear set is generally located in a closed chamber, and individual gears of the reduction gear set are meshed by straight teeth. In order to increase the rotational speed of the steering gear and prevent damage to the steering gear, each gear tooth of the reduction gear set in the steering gear is generally greased so as to form a lubricating oil film on the tooth surface of each gear, thereby ensuring that fluid lubrication conditions can be reached in a meshing area and preventing individual gears from rubbing against each other and wearing. Due to limited amount of grease on inner gears of the existing steering gear, the grease will dry out and the gears will wear out after the steering gear works for a period of time, resulting in a decrease in the output speed of the steering gear, affecting the service life of the steering gear, and making noise in severe cases.

Therefore, the inventor commits to designing a steering gear to solve the above problems.

SUMMARY

The present invention aims to provide an oil-immersed steering gear with stable output speed, prolonged service life, and no noise made.

In order to achieve the above object, the present invention adopts a technical solution as follows:

an oil-immersed steering gear, including a shell assembly, where a control chamber and an oil immersion chamber are separated in the shell assembly, liquid gear oil is filled in the oil immersion chamber, a control board is accommodated in the control chamber, a motor and a potentiometer are arranged on the control board, an output end of the motor is connected to an output gear shat of the potentiometer through a gear transmission assembly in a transmission manner, the gear transmission assembly is located in the oil immersion chamber and immersed in the liquid gear oil, and the output gear shaft rotates to pass through the oil immersion chamber and extend outside the shell assembly.

As an improvement of the oil-immersed steering gear of the present invention, an output end surface of the shell assembly is provided with an oil injection hole, which communicates with the oil immersion chamber, and a hole sealing screw is screwed in the oil injection hole in a sealing manner.

As an improvement of the oil-immersed steering gear of the present invention, a side surface of the shell assembly is provided with an oil outlet hole, which communicates with the oil immersion chamber, and a transparent oil cap is covered on the oil outlet hole in a sealing manner.

As an improvement of the oil-immersed steering gear of the present invention, the oil immersion chamber and the control chamber are separated in a column, the shell assembly includes an upper cover, a middle shell and a bottom cover, the upper cover is covered on the top of the middle shell in a sealing manner to form the oil immersion chamber, and the bottom cover is covered on the bottom of the middle shell in a sealing manner to form the control chamber.

As an improvement of the oil-immersed steering gear of the present invention, the motor is located in the control chamber, an output end of the motor is provided with an input gear shaft, and the input gear shaft and the motor are both connected to the shell assembly in a sealing manner.

As an improvement of the oil-immersed steering gear of the present invention, an end surface of the motor is connected to the shell assembly in a sealing manner through a motor sealing ring, and the outside of the input gear shaft is connected to the shell assembly in a sealing manner through a motor oil seal.

As an improvement of the oil-immersed steering gear of the present invention, the gear transmission assembly includes an one-stage helical gear, a two-stage helical gear set, a three-stage helical gear set, a four-stage helical gear set, and a five-stage helical gear; the one-stage helical gear is located on the input gear shaft, the five-stage helical gear is located on the output gear shaft, and the one-stage helical gear is connected in a transmission manner to the five-stage helical gear through the two-stage helical gear set, the three-stage helical gear set, and the four-stage helical gear set in turn.

As an improvement of the oil-immersed steering gear of the present invention, a two and four-stage gear shaft is arranged between the output gear shaft and the input gear shaft, the two and four-stage gear shaft is located in the oil immersion chamber and both ends of the two and four-stage gear shaft are rotatably connected to the shell assembly respectively through first bearings, and the two-stage helical gear set and the four-stage helical gear set are both located on the two and four-stage gear shaft.

As an improvement of the oil-immersed steering gear of the present invention, a positioning part is protruded on the bottom of the oil immersion chamber, the one-stage helical gear is located in the positioning part and helical teeth of the one-stage helical gear are exposed in the positioning part, the three-stage helical gear set is arranged on a three-stage gear shaft which is disposed coaxially with the positioning part, one end of the three-stage gear shaft is rotatably connected to the shell assembly through a third bearing, and the other end of the three-stage gear shaft is sleeved outside the positioning part and rotatably connected to the positioning part through the other third bearing.

As an improvement of the oil-immersed steering gear of the present invention, the potentiometer is located in the control chamber, both ends of the output gear shaft are rotatably connected to the shell assembly respectively through fourth bearings, and both ends of the output gear shaft are connected to the shell assembly in a sealing manner respectively through output gear shaft oil seals.

Compared to the prior art, according to the oil-immersed steering gear of the present invention, the gear transmission assembly is immersed in the liquid gear oil in the oil immersion chamber, so that fluid lubrication conditions can be maintained in a meshing area of the gear transmission assembly for a long time, thereby preventing gear wear, ensuring stable output speed, and prolonging the service life of the steering gear. Even if the steering gear is used for a long time, no noise will be made.

Figure 1:
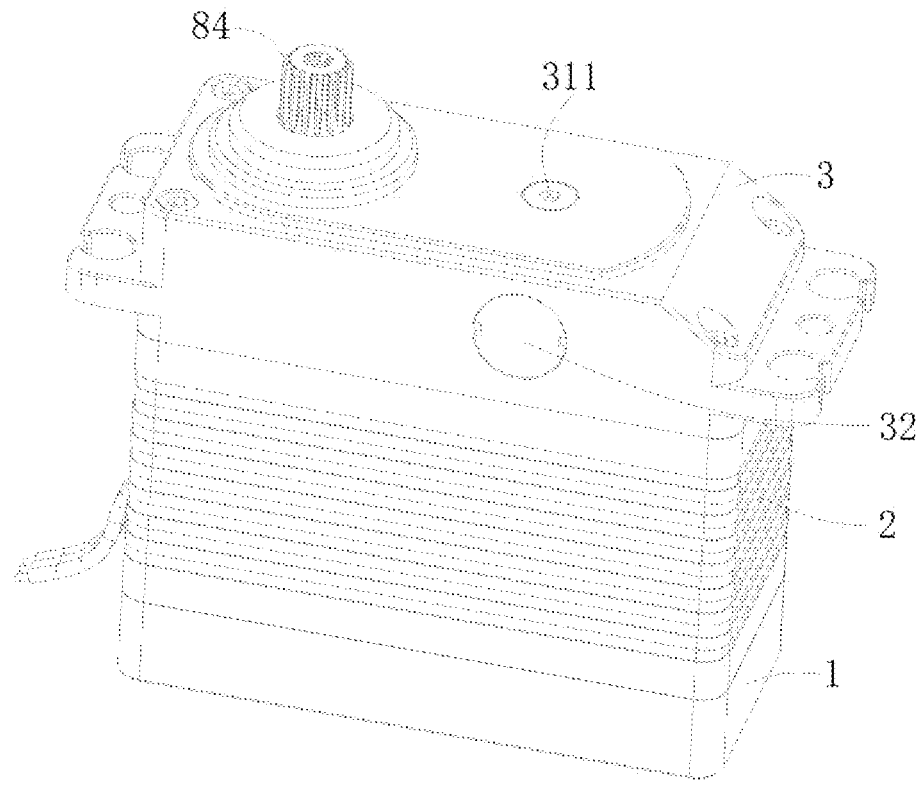
FIG. 1 is a perspective view of the oil-immersed steering gear of the present invention.

Description of reference numerals: 1, bottom cover; 2, middle shell; 21, sealing element; 22, positioning part; 3, upper cover; 31, oil injection hole; 311, hole sealing screw; 312, hole sealing ring; 32, oil cap; 321, oil sealing ring; 322, oil outlet hole; 4, control board; 41, motor; 411, motor oil seal; 412, motor sealing ring; 42, potentiometer; 43, sealing cap; 5, input gear shaft; 51, one-stage helical gear; 6, two and four-stage gear shaft; 61, two-stage helical gear; 62, two-stage coaxial helical gear; 63, four-stage helical gear; 64, four-stage coaxial helical gear; 65, first bearing; 7, three-stage gear shaft; 71, three-stage helical gear; 72, three-stage coaxial helical gear; 73, second bearing; 74, third bearing; 8, output gear shaft; 81, five-stage helical gear; 82, fourth bearing; 83, output gear shaft oil seal; and 84, output gear.

DETAILED DESCRIPTION OF THE EMBODIMENTS

Embodiments of the present invention are specifically illustrated below in conjunction with the accompanying drawings. The accompanying drawings are for reference and description only, and do not constitute a limitation on the scope of patent protection of the present invention.

Referring to FIG. 1 to FIG. 4, an oil-immersed steering gear includes a shell assembly, a control board 4, a motor 41, a potentiometer 42, and a gear transmission assembly. A control chamber and an oil immersion chamber are separated in the shell assembly. Liquid gear oil is filled in the oil immersion chamber. The control board 4 is accommodated in the control chamber. The motor 41 and potentiometer 42 are arranged on the control board 4. An output end of the motor 41 is connected to an output gear shaft 8 of the potentiometer 42 through the gear transmission assembly in a transmission manner. The gear transmission assembly is located in the oil immersion chamber and immersed in the liquid gear oil. The output gear shaft 8 rotates to pass through the oil immersion chamber and extend outside the shell assembly.

Figure 2:
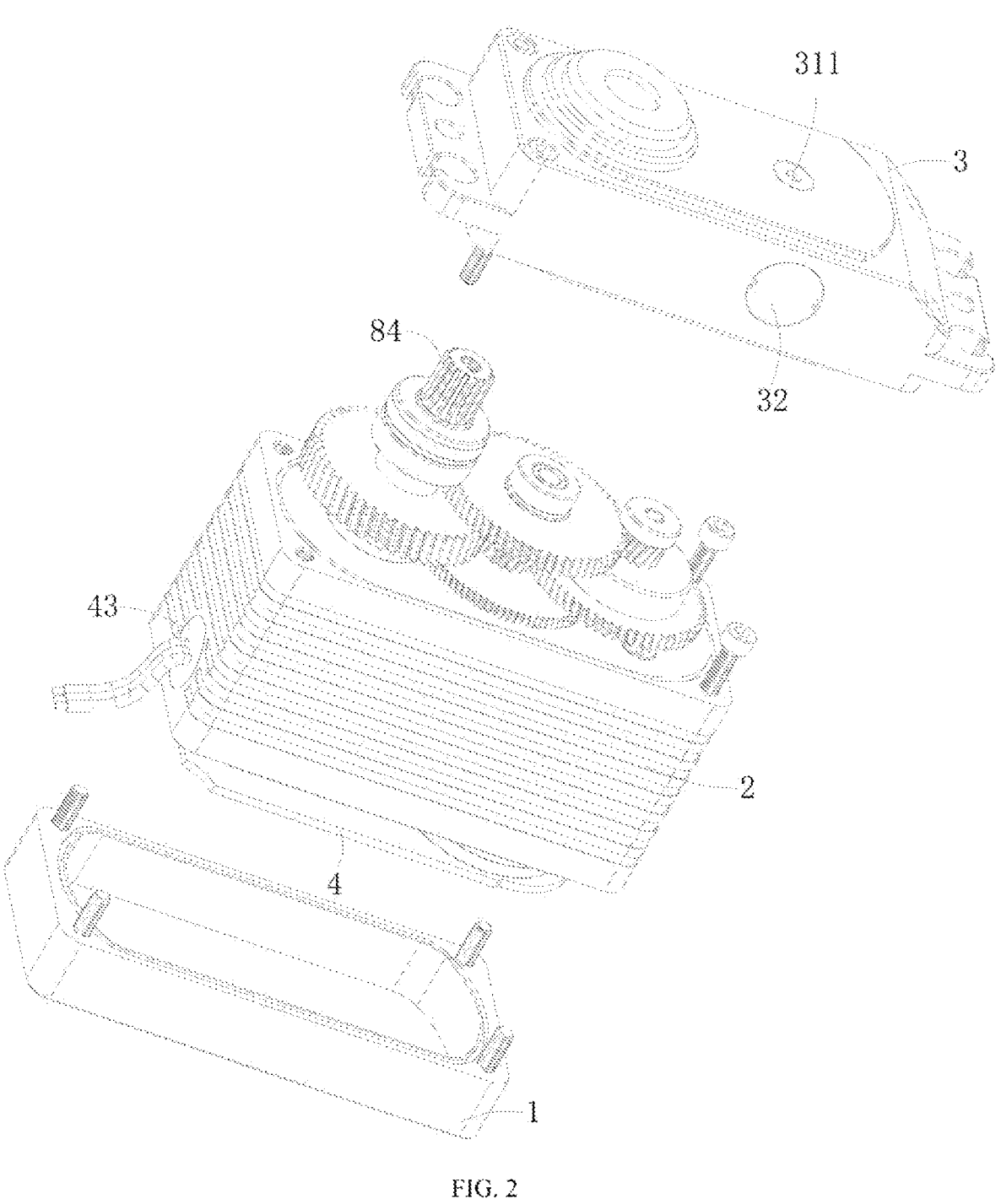
FIG. 2 is an exploded perspective view of the oil-immersed steering gear of the present invention.
Figure 3:
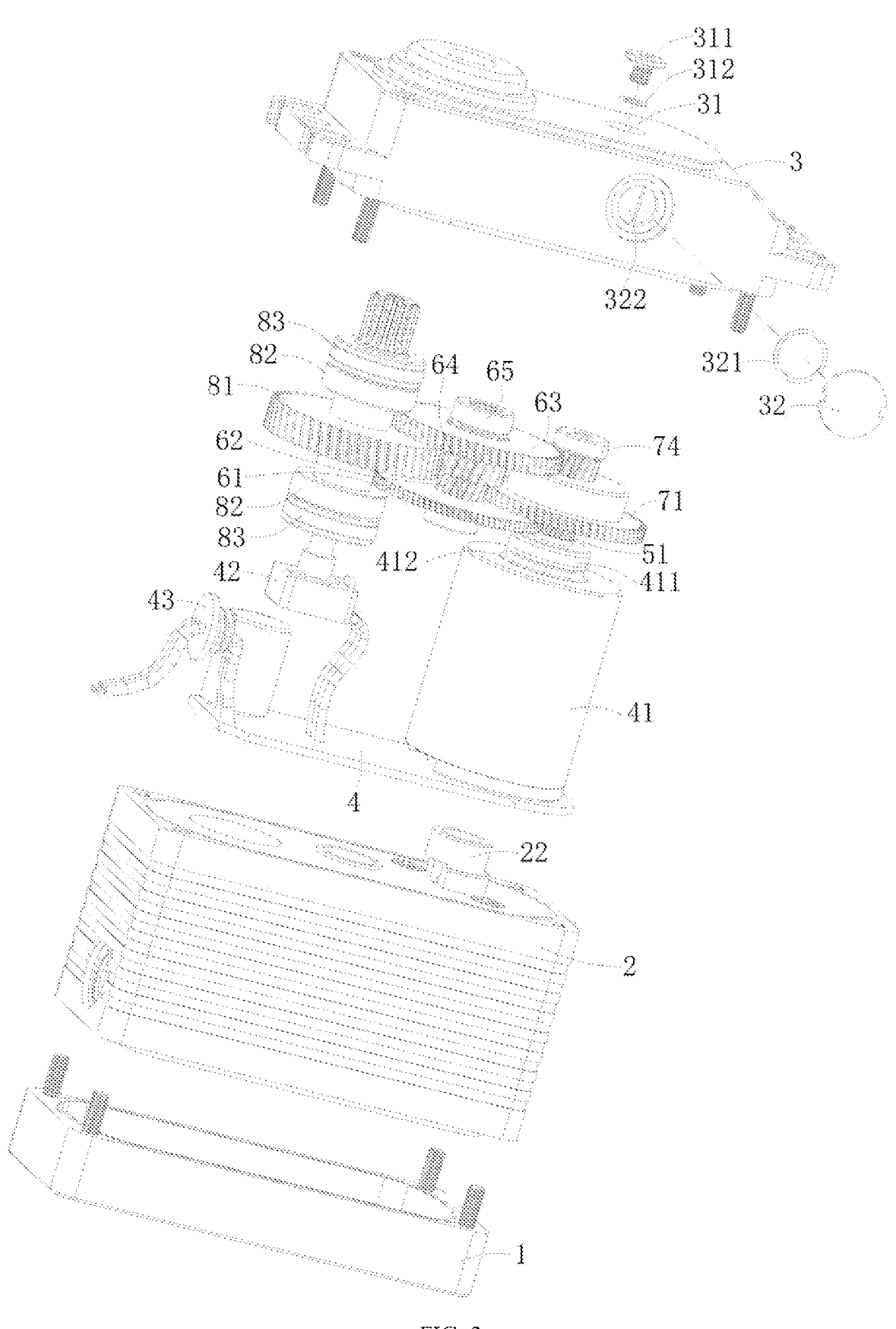
FIG. 3 is another exploded perspective view of the oil-immersed steering gear of the present invention.
Figure 4:
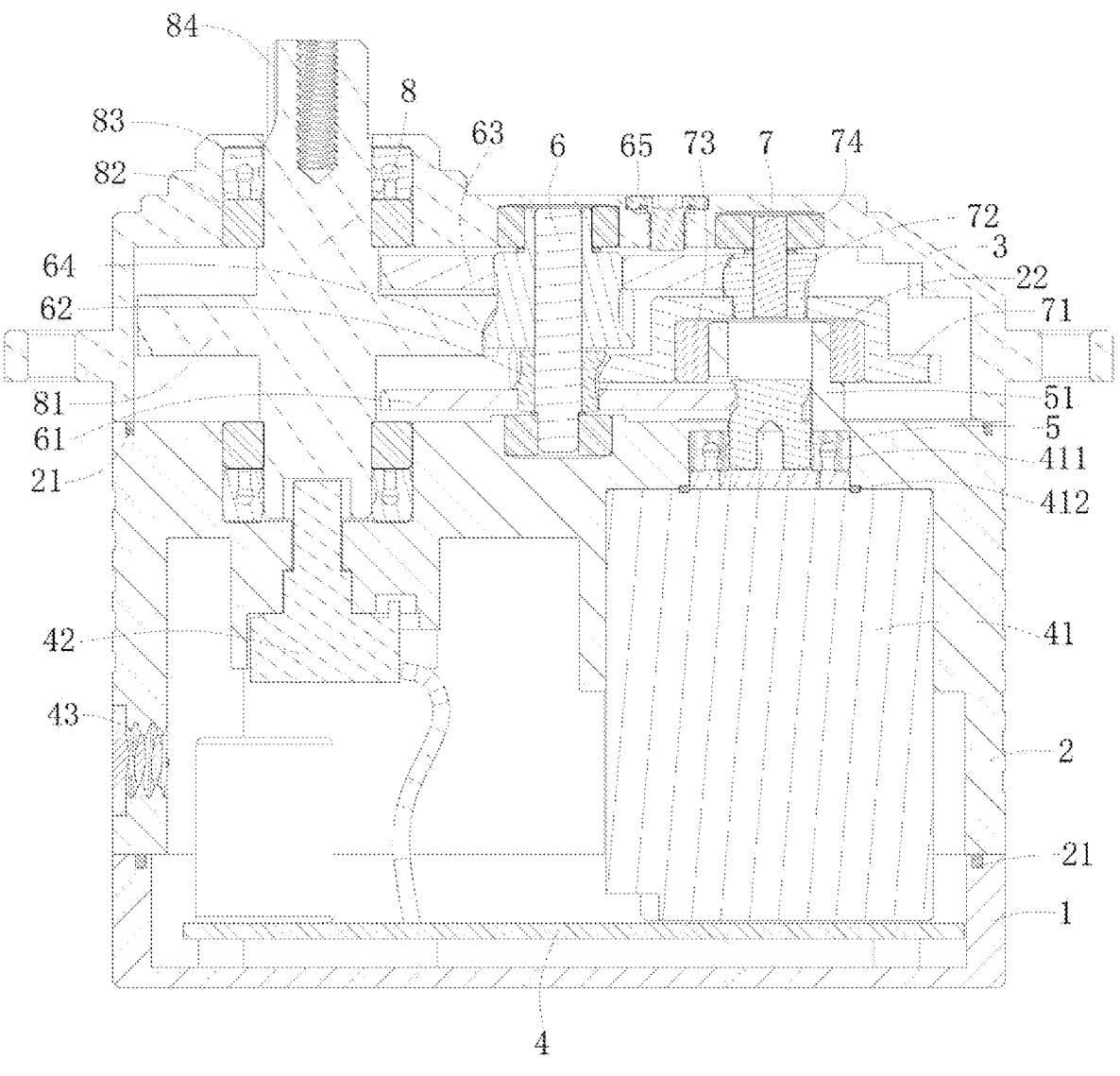
FIG. 4 is an enlarged cross-sectional view of the oil-immersed steering gear of the present invention.

Referring to FIG. 2 to FIG. 4, the shell assembly includes a bottom cover 1, a middle shell 2 and an upper cover 3. The top of the bottom cover 1 is concave and fixedly connected to the middle shell 2 through four fastening screws. A sealing element 21 is provided in a groove on a covering surface of the bottom cover 1, and the bottom cover 1 is covered on the bottom of the middle shell 2 through the sealing element 21 in a sealing manner to form the control chamber. The middle shell 2 is located between the bottom cover 1 and the upper cover 3. The bottom of the middle shell 2 is concave, and a mounting panel is formed on the top of the middle shell 2. Another sealing element 21 is provided in a groove on a covering surface on the top of the middle shell 2, and the upper cover 3 is covered on the top of the middle shell 2 through the sealing element 21 in a sealing manner to form the oil immersion chamber. The top of the middle shell 2 extends vertically outward to form a positioning part 22, which is annular and provided with a notch on its side surface. The entire positioning part 22 is located in the oil immersion chamber and protrudes at the bottom of the oil immersion chamber. A second bearing 73 is sleeved outside the positioning part 22. The bottom of the upper cover 3 is concave and fixedly connected to the middle shell 2 through four fixing screws. In order to facilitate a user to inject liquid gear oil into the oil immersion chamber, an output end face of the upper cover 3 (that is, the top of the upper cover 3) is provided with an oil injection hole 31, which communicates with the oil immersion chamber, so that the user injects an appropriate amount of liquid gear oil into the oil immersion chamber through the oil injection hole 31. A hole sealing screw 311 is screwed into the oil injection hole 31 through a hole sealing ring 312 in a sealing manner, and the hole sealing screw 311 can prevent the liquid gear oil in the oil immersion chamber from overflowing. The side surface of the upper cover 3 is further provided with an oil outlet hole 322, which communicates with the oil immersion chamber and can be used to pour out the liquid gear oil that has been used in the oil immersion chamber. An oil cap 32 is covered on the oil outlet hole 322 through an oil sealing ring 321 in a sealing manner. The oil cap 32 is transparent, which is convenient for the user to check the injection amount or storage amount of liquid gear oil in the oil immersion chamber.

Referring to FIG. 2 to FIG. 4, the oil immersion chamber and the control chamber are arranged in a column and separated from up to down, that is, the oil immersion chamber is located directly below the control chamber. The control board 4, the motor 41 and the potentiometer 42 are all located in the control chamber. The control board 4 is fixed on the bottom of the control chamber. The motor 41 is vertically arranged on the control board 4 and is electrically connected to the control board 4. An input gear shaft 5 is coaxially provided on an output shaft of the motor 41, and the input gear shaft 5 and the motor 41 are both connected to the middle shell 2 in a sealing manner. In the present invention, the output shaft of the motor 41 can be connected to the middle shell 2 in a sealing manner, and an end surface of a housing of the motor 41 can also be connected to the middle shell 2 in a sealing manner. Preferably in the present invention, the end surface of the motor 41 is provided with a motor sealing ring 412, and the end surface of the housing of the motor 41 is connected to the middle shell 2 through the motor sealing ring 412 in a sealing manner. The input gear shaft 5 passes through a mounting panel of the middle shell 2 and extends into the oil immersion chamber. A motor oil seal 411 is sleeved outside the input gear shaft 5, and the input gear shaft 5 is connected to the mounting panel of the middle shell 2 through the motor oil seal 411 in a sealing manner. The input gear shaft 5 is integrally located in the positioning part 22. The potentiometer 42 is fixed on the middle shell 2 and is located above the control board 4. The potentiometer 42 and the motor 41 are disposed at intervals. The potentiometer 42 is electrically connected to the control board 4. The output gear shaft 8 is coaxial and positioned on the output shaft of the potentiometer 42. The output gear shaft 8 is spaced from the input gear shaft 5. The lower end of the output gear shaft 8 is an input end, and the upper end thereof is an output end. The output gear shaft 8 rotates to pass through the middle shell 2 and the oil immersion chamber and extend outside the upper cover 3. Specifically, the input end and the output end of the output gear shaft 8 are respectively superimposed and sleeved with an output gear shaft oil seal 83 and a fourth bearing 82 along its axial direction. Two fourth bearings 82 are located between two output gear shaft oil seals 83. The input end of the output gear shaft 8 is rotatably connected to the middle shell 2 through the lower fourth bearing 82, the input end of the output gear shaft 8 is connected to the middle shell 2 through the lower output gear shaft oil seal 83 in a sealing manner; the output end of the output gear shaft 8 is rotatably connected to the upper cover 3 through the upper fourth bearing 82, and the output end of the output gear shaft 8 is connected to the upper cover 3 through the upper output gear shaft oil seal 83 in a sealing manner. In order to connect the control board 4 to a power supply source, a side wall of the middle shell 2 is also provided with an opening for wiring, and a sealing cap 43 is covered on the opening.

Referring to FIG. 2 to FIG. 4, the gear transmission assembly may be composed of straight teeth or helical teeth. The gear transmission assembly of the present invention is preferably composed of helical teeth. The gear transmission assembly includes an one-stage helical gear 51, a two-stage helical gear set, a three-stage helical gear set, a four-stage helical gear set, and a five-stage helical gear 81, where the five-stage helical gear 81 is located on the output gear shaft 8, and the one-stage helical gear 51 is connected in a transmission manner to the five-stage helical gear 81 through the two-stage helical gear set, the three-stage helical gear set, and the four-stage helical gear set in turn. The one-stage helical gear 51 is coaxially arranged on the input gear shaft 5 and located in the positioning part 22. Part of the helical teeth of the one-stage helical gear 51 are exposed in a notch on the side surface of the positioning part 22. A two and four-stage gear shaft 6 is arranged between the output gear shaft 8 and the input gear shaft 5, and the two and four-stage gear shaft 6 is located in the oil immersion chamber. Both ends of the two and four-stage gear shaft 6 are respectively provided with first bearings 65. An upper end of the two and four-stage gear shaft 6 is rotatably connected to the upper cover 3 through the upper first bearing 65, and a lower end of the two and four-stage gear shaft 6 is rotatably connected to the middle shell 2 through the lower second bearing 73. The two-stage helical gear set and the four-stage helical gear set are both located on the two and four-stage gear shaft 6. The two-stage helical gear set includes a two-stage helical gear 61 and a two-stage coaxial helical gear 62, which are coaxial gears and both sleeved on the same two and four-stage gear shaft 6. The two-stage helical gear 61 is located below the two-stage coaxial helical gear 62, and the two-stage helical gear 61 is meshed with the one-stage helical gear 51. The three-stage helical gear set is arranged on the three-stage gear shaft 7 which is coaxially disposed with the positioning part 22. A top end of the three-stage gear shaft 7 is sleeved with a third bearing 74, and an inner ring of the third bearing 74 is fixedly connected to the three-stage gear shaft 7. The top end of the three-stage gear shaft 7 is rotatably connected to the upper cover 3 through the third bearing 74. The three-stage helical gear set includes a three-stage helical gear 71 and a three-stage coaxial helical gear 72, which are both sleeved on the three-stage gear shaft 7 and are disposed coaxially with the three-stage gear shaft 7. The three-stage helical gear 71 is sleeved outside the second bearing 73, is rotatably connected to the positioning part 22 through the second bearing 7, and is meshed with the two-stage coaxial helical gear 62. The four-stage helical gear set includes a four-stage helical gear 63 and a four-stage coaxial helical gear 64, where a lower end of the four-stage coaxial helical gear 64 is provided with helical teeth. The entire four-stage coaxial helical gear 64 is integrally formed and fixedly sleeved on an upper end of the two-stage coaxial helical gear 62. An inner ring of the first bearing 65 and the four-stage helical gear 63 are fixedly sleeved in turn from top to bottom on an upper end of the four-stage coaxial helical gear 64. The four-stage helical gear 63 is located above the helical teeth of the four-stage coaxial helical gear 64, and the four-stage helical gear 63 is meshed with the three-stage coaxial helical gear 72. The five-stage helical gear 81 is sleeved on the output gear shaft 8, and the five-stage helical gear 81 is meshed with the helical teeth of the four-stage coaxial helical gear 64. An output end of the output gear shaft 8 is further provided with an output gear 84, which is located outside the upper cover 3.

Referring to FIG. 1 to FIG. 4, the working principle of the oil-immersed steering gear of the present invention is as follows:

the motor 41 controls the input gear shaft 5 to rotate, the input gear shaft 5 drives the one-stage helical gear 51 to rotate, the one-stage helical gear 51 drives the two-stage helical gear 61 to rotate, the two-stage coaxial helical gear 62 rotates synchronously with the two-stage helical gear 61 and drives the three-stage helical gear 71 to rotate, the three-stage coaxial helical gear 72 rotates with the three-stage helical gear 71 and drives the four-stage helical gear 63 to rotate, the four-stage coaxial helical gear 64 rotates synchronously with the four-stage helical gear 63 and drives the five-stage helical gear 81 to rotate, so as to drive the output gear shaft 8 to rotate, and the output gear 84 rotates with the output gear shaft 8, thereby controlling the steering wheel to rotate, while driving the potentiometer 42 to feed back position information. The potentiometer 42 controls the rotating direction and speed of the motor 41 through the control board 4, so that the target stops.

Referring to FIG. 1 to FIG. 4, the oil injection method of the oil-immersed steering gear of the present invention involves as follows:

directly opening the hole sealing screw 311, injecting an appropriate amount of liquid gear oil into the oil immersion chamber from the oil injection hole 31, observing the injection amount of liquid gear oil in the oil immersion chamber through the oil cap 32 at the same time until the appropriate amount of liquid gear oil is injected into the oil immersion chamber, immersing various helical teeth, stopping oil injection, and sealing and blocking the oil injection hole 31 with the hole sealing screw 311 to prevent the liquid gear oil in the oil immersion chamber from overflowing.

Referring to FIG. 1 to FIG. 4, the oil change method of the oil-immersed steering gear of the present invention involves as follows:

a user directly removes the oil cap 32 so that the liquid gear oil that has been used in the oil immersion chamber can be poured out from the oil outlet hole 322, and closes the oil cap 32 and pulls the hole sealing screw 311 out so that the liquid gear oil can be injected from the oil injection hole 31.

The oil-immersed steering gear of the present invention has the beneficial technical effects as follows:

(1) a gear transmission assembly is arranged in the oil immersion chamber, and a plurality of helical teeth are used for transmission to improve the accuracy of the steering gear;

(2) each helical tooth is immersed in the liquid gear oil in the oil immersion chamber, so that fluid lubrication conditions are maintained in a meshing area of the gear transmission assembly for a long time, thereby preventing gear wear, ensuring stable output speed, and prolonging the service life of the steering gear; even if the steering gear is used for a long time, no noise will be made;

(3) each gear shaft is rotatably connected to the shell assembly using bearings, which is not affected by the temperature; even if the temperature of each gear shaft rises with the rotation of the helical teeth, resulting in expanded gear shafts with heat, the gear shafts will not get stuck;

(4) the mounting panel of the middle shell 2 separates the interior of the shell assembly to form an oil immersion chamber and a control chamber, so that the motor 41, the potentiometer 42 and the control board 4 are separated from the gear transmission assembly and are arranged in a sealing manner, thereby enhancing the waterproof performance of the entire steering gear; and (5) by providing an oil injection hole 31 on the upper cover 3, it is convenient to inject liquid gear oil into the oil immersion chamber, and at the same time, the injection amount of liquid gear oil in the oil immersion chamber can be checked at any time by using the oil cap 32, thereby preventing the injection amount of liquid gear oil from not reaching the fluid lubrication conditions, resulting in mutual friction and wear of the gears.

The above disclosed are only preferred embodiments of the present invention, and cannot be used to limit the protection scope of the present invention. Therefore, equivalent changes made in the scope of the patent application of the present invention still fall within the scope covered by the present invention.

What is claimed is:

1. An oil-immersed steering gear, comprising a shell assembly, wherein a control chamber and an oil immersion chamber are separated in the shell assembly, liquid gear oil is filled in the oil immersion chamber, a control board is accommodated in the control chamber, a motor and a potentiometer are arranged on the control board, an output end of the motor is connected to an output gear shaft of the potentiometer through a gear transmission assembly in a transmission manner, the gear transmission assembly is located in the oil immersion chamber and immersed in the liquid gear oil, and the output gear shaft rotates to pass through the oil immersion chamber and extend outside the shell assembly, wherein a side surface of the shell assembly is provided with an oil outlet hole, which communicates with the oil immersion chamber, and a transparent oil cap is covered on the oil outlet hole in a sealing manner.

2. The oil-immersed steering gear according to claim 1, wherein an output end surface of the shell assembly is provided with an oil injection hole, which communicates with the oil immersion chamber, and a hole sealing screw is screwed in the oil injection hole in a sealing manner.

3. The oil-immersed steering gear according to claim 1, wherein the oil immersion chamber and the control chamber are separated in a column, the shell assembly comprises an upper cover, a middle shell and a bottom cover, the upper cover is covered on the top of the middle shell in a sealing manner to form the oil immersion chamber, and the bottom cover is covered on the bottom of the middle shell in a sealing manner to form the control chamber.

4. The oil-immersed steering gear according to claim 1, wherein the motor is located in the control chamber, the output end of the motor is provided with an input gear shaft, and the input gear shaft and the motor are both connected to the shell assembly in a sealing manner.

5. The oil-immersed steering gear according to claim 4, wherein an end surface of the motor is connected to the shell assembly in a sealing manner through a motor sealing ring, and the outside of the input gear shaft is connected to the shell assembly in a sealing manner through a motor oil seal.

6. The oil-immersed steering gear according to claim 4, wherein the gear transmission assembly comprises a one-stage helical gear, a two-stage helical gear set, a three-stage helical gear set, a four-stage helical gear set, and a five-stage helical gear; the one-stage helical gear is located on the input gear shaft, the five-stage helical gear is located on the output gear shaft, and the one-stage helical gear is connected in a transmission manner to the five-stage helical gear through the two-stage helical gear set, the three-stage helical gear set, and the four-stage helical gear set in turn.

7. The oil-immersed steering gear according to claim 6, wherein a two and four-stage gear shaft is arranged between the output gear shaft and the input gear shaft, the two and four-stage gear shaft is located in the oil immersion chamber and both ends of the two and four-stage gear shaft are rotatably connected to the shell assembly respectively through first bearings, and the two-stage helical gear set and the four-stage helical gear set are both located on the two and four-stage gear shaft.

8. The oil-immersed steering gear according to claim 6, wherein a positioning part is protruded on the bottom of the oil immersion chamber, the one-stage helical gear is located in the positioning part and helical teeth of the one-stage helical gear are exposed in the positioning part, the three-stage helical gear set is arranged on a three-stage gear shaft which is disposed coaxially with the positioning part, one end of the three-stage gear shaft is rotatably connected to the shell assembly through a third bearing, and the other end of the three-stage gear shaft is sleeved outside the positioning part and rotatably connected to the positioning part through the other third bearing.

9. The oil-immersed steering gear according to claim 1, wherein the potentiometer is located in the control chamber, both ends of the output gear shaft are rotatably connected to the shell assembly respectively through fourth bearings, and both ends of the output gear shaft are connected to the shell assembly in a sealing manner respectively through output gear shaft oil seals.

\* \* \* \* \*